No. 791,861. PATENTED JUNE 6, 1905.
E. J. BASYE.
STRAINER FOR PUMPS AND DEEP TUBULAR WELLS.
APPLICATION FILED AUG. 16, 1904.
2 SHEETS—SHEET 2.
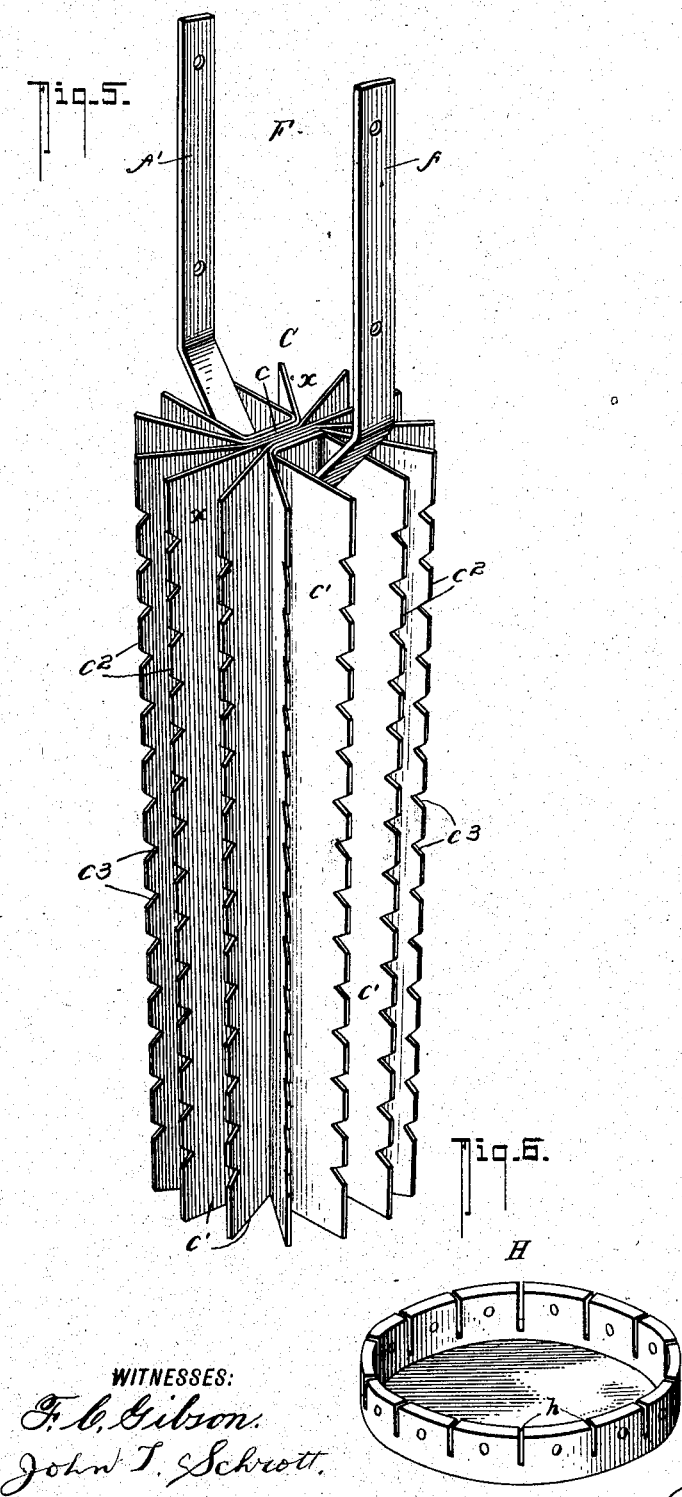
WITNESSES:
F. C. Gibson.
John T. Schrott.
INVENTOR
Edwin J. Basye.
BY
Fred G. Dieterich & Co.
ATTORNEYS No. 791,861.

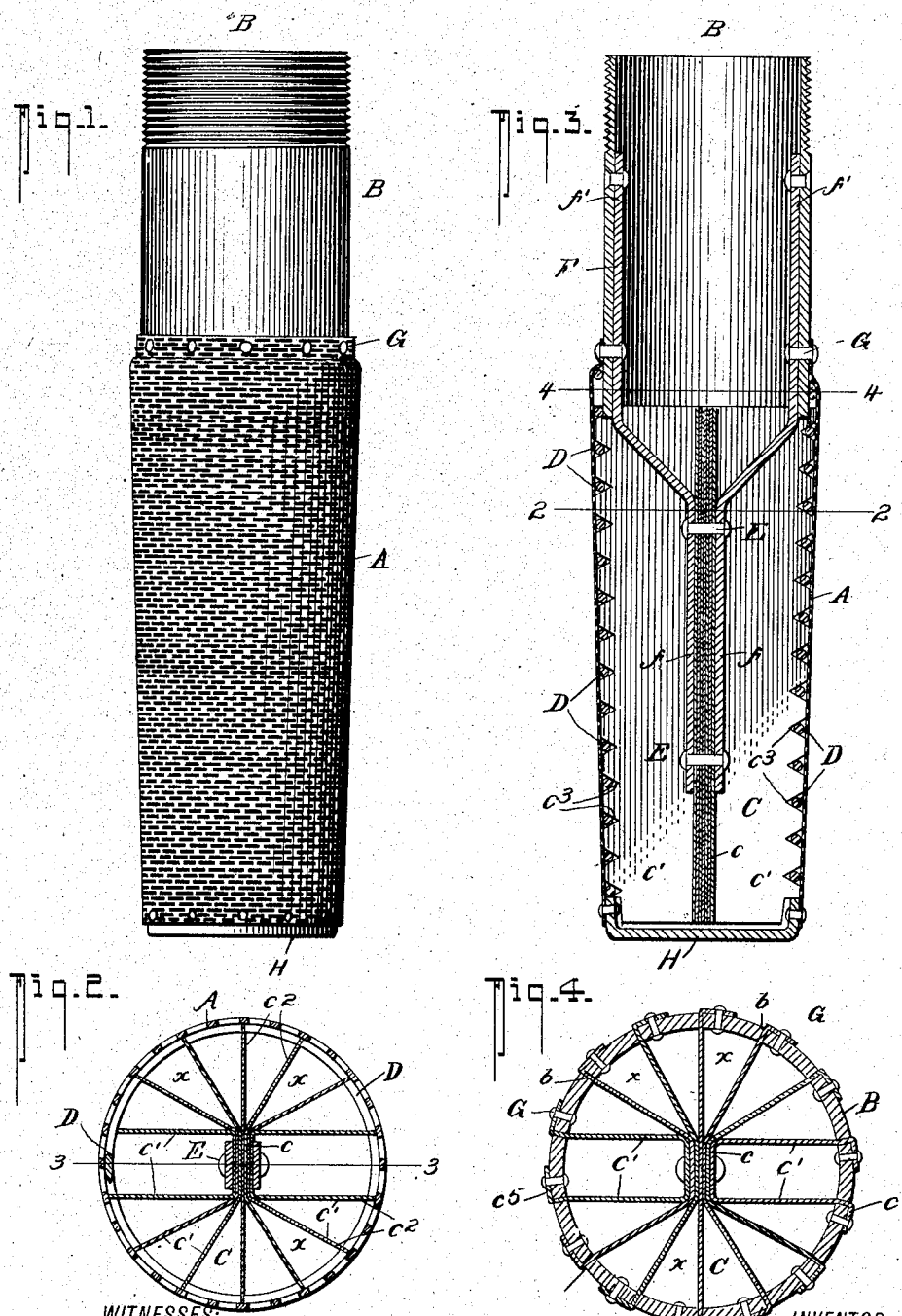

Patented June 6, 1905.

UNITED STATES PATENT OFFICE.

EDWIN J. BASYE, OF ROCK RAPIDS, IOWA.

STRAINER FOR PUMPS AND DEEP TUBULAR WELLS.

SPECIFICATION forming part of Letters Patent No. 791,861, dated June 6, 1905.

Application filed August 16, 1904. Serial No. 220,939.

*To all whom it may concern:*

Be it known that I, EDWIN J. BASYE, residing at Rock Rapids, in the county of Lyon and State of Iowa, have invented a new and Improved Strainer for Pumps and Deep or Tubular Wells, of which the following is a specification.

This invention relates to improvements in that class of strainer or screening means for water wells and pumps especially designed for straining the fluid drawn into the pump barrel or tube, whereby to prevent sand and other solids from entering the pump-barrels or well-tubes; and the said invention generally comprehends an improved screening means adapted to be secured to or near the lower end of the pump-barrel and comprising a series of vertically-disposed and arbitrarily-arranged plates that divide the water-inlet portion of the barrel into a series of independent vertical passages or chambers, which chambers are partly formed by a screen or gauze casing wrapped around the outer edge of all of the vertically-disposed division-plates, the several parts being particularly designed to produce an economical, durable, and effective straining attachment for well tubes or barrels.

In its more complete nature my invention embodies a straining attachment formed of a series of vertically-extended and radially-projected plates whose outer edges are notched to receive a reinforcement of wire that is wound about the edges of the division-plates and an outer metal screen or gauze covering, and in its more subordinate features my invention consists in certain details of construction and peculiar combination of parts, all of which will be hereinafter fully described, claimed, and illustrated in the accompanying drawings, in which—

Figure 1 is a side elevation of a portion of a pump-barrel with my screen or strainer devices applied. Fig. 2 is a horizontal section thereof on the line 2 2 of Fig. 3. Fig. 3 is a vertical section on the line 3 3 of Fig. 2. Fig. 4 is a horizontal section on the line 4 4 of Fig. 3, showing a modified manner of securing the division-plates to the pipe. Fig. 5 is a perspective view which illustrates the general arrangement of the internal division or fluid-separating plates. Fig. 6 is a detail view of the cap-plate for the lower end of the strainer.

In my invention the strainer devices are made tapering, as best shown in Figs. 1 and 3, whereby to facilitate the insertion or withdrawal of the parts in the practical application thereof; but the said strainer devices may, if desired, be of uniform cross-sectional diameter the full length thereof, and the lower end of the strainer or screen devices may be as shown in Fig. 3, or it may be closed by the cap-piece shown in Fig. 6, the special construction of which will be hereinafter explained.

The strainer devices in my invention comprise a cylindrical casing A, of perforated metal, as shown, or of screening material of suitable mesh, the upper end of which is securely fastened to the lower end of the pump-barrel B when the parts are arranged as shown in Figs. 1 and 3.

When the casing A is secured at its upper end only, it is made tapering, as shown, and the said upper end of the casing may be secured to the lower end of the pump-barrel by riveting, soldering, or otherwise; but on the score of economy of construction I prefer to connect the said screen or casing A with the pump-barrel B in the manner clearly shown in Fig. 4, as the means of fastening there shown may also be utilized for securing the upper ends of the division-plates C, the peculiar construction of which and their coöperative arrangement with the screen-casing A forms the essential feature of my invention. The division members C are each formed of stout flexible metallic plates capable of being bent to a desired shape, and the several plates extend the full length of the screen-casing A, and when used in connection with a tapering casing they are also made tapering, as shown. The plates C C (see Fig. 2) are coöperatively joined with and are bent up with respect to each other, whereby to form a central bearing portion $c$ and radial extensions $c'$ $c'$, whose outer edges $c^2$ $c^2$ abut the screen-casing A, and the several plates C are so correlatively joined with each other whereby to produce, as it were, a series of V-shaped spaces or independent waterways $x$ $x$, that extend the full length of the casing. To securely brace the division-plates C, a stout wire D is coiled or wound about the outer edges of the said plates.

To provide for a close fitting of the casing A against the outer edges of the plate C and also for leaving the maximum surface of the gauze or screen casing unobstructed, I form the outer edges of the said plate C with V-shaped notches $c^s$, in which a wire-coil winding D seats. When the foraminated jacket or casing is used, I prefer to use round wire, as shown in Fig. 3, for the reason that but a small portion of the jacket or casing will be closed off by contact with the said wire, thus leaving the maximum amount of the perforated gauze or screen casing exposed on the inside to allow for the free passage of the water or other fluids into the pump-barrel.

In the construction shown in Fig. 3 I secure the several plates to each other by rivets E, that pass through the abutting portions of the several plates and also through the pendent members $f$ of bracket-arms F, the upper ends of which, $f'$, are spread and are riveted to the lower end of the pipe B, as shown.

In Fig. 4 I have illustrated a modified means of connecting the upper ends of the plate C to the lower end of the pipe B, and in such construction the lower end of the pipe B is slitted longitudinally, as at $b$, to receive the upper ends of the plate C, and the upper ends of the plate C are formed with extensions $c^5$, which are adapted to be bent at right angles over the outside of the pipe and secured to the said pipe by the rivets G, that secure the upper ends of the casing A, as shown in Fig. 4.

When my improved strainer is constructed as shown in Figs. 1 and 3, the lower end thereof is preferably closed by a cap-piece H, provided with radial slits $h$ to receive the projecting end $c^6$ on the lower ends of the plate C, which are bent at right angles over the rim of the cap H and are secured by the rivets that secure the lower end of the casing to the cap H and the plate C in a manner substantially the same as shown in Fig. 4.

From the foregoing description, taken in connection with the accompanying drawings, the complete construction and advantage of my invention will be readily apparent to those skilled in the art to which it appertains.

It will be noticed that in my construction of strainer the parts can be economically constructed and easily assembled, and since the interior of the strainer-casing is divided into a number of independent vertical channels the plates C are constantly flushed or washed as the fluid is drawn through the strainer and danger of clogging thereof is overcome. I am aware that strainers have heretofore been provided in which the barrel is formed with inlets surrounded by the perforated or screen casing, which is spaced from the barrel by wire strands wound about the outer edges of the pipe. In my construction it will be noticed that the casing fits close against the outer edges of the plate C, and with the binder-wire, by reason of the manner in which it is seated on the peripheral edges of the plate C, does not act as a retarding means to the fluid or as a means for clogging the interior surface of the casing. Furthermore, by reason of the peculiar manner in which the plate C and the wire D and the casing A are joined I am enabled to produce a very compact, strong, and durable strainer or screening means for the purposes stated.

Having thus described my invention, what I claim, and desire to secure by Letters Patent, is—

1. The combination with a pump-barrel; of a strainer connected to the inlet end thereof which comprises a screening-casing, and a series of radially-projected centrally-connected division-plates that extend lengthwise of and are located within the casing, and a means for attaching the plates and the casing to the pump.

2. A strainer for pump-barrels or tubes, which comprises a screening-casing, a series of radially-projected division-plates mounted within the casing and extending lengthwise thereof entirely across the interior thereof, the said casing and plates being adapted to be secured to the inlet end of the barrel.

3. A strainer for pump-barrels which comprises a tapering screening-casing, a series of centrally-connected and radially-disposed tapering division-plates mounted within the casing and extending the length thereof, the outer edges of the said plates engaging the inner surface of the casing, and a means for attaching the casing and the plates to the entrant end of the pump-barrel, for the purposes specified.

4. A strainer for pumps which comprises in combination with a pump-barrel; a series of plates disposed in the longitudinal plane of the open end of the barrel and which are joined to each other and which include radially-projected portions, a screening-casing that surrounds the said plates and a means for securing the casing and the plates to each other and to the entrant end of the pump-barrel.

5. The combination with a pump-tube of a strainer which comprises a series of radially-projected division-plates extended in the longitudinal plane of the pump-tube, a wire helix over the outer edges of the said plates, and a perforated casing that fits over the said wires and the plates, and a means for attaching the plates and the casing to the pump-barrel.

6. The combination with a pump-tube; of a strainer which comprises a series of radially-projected division-plates provided with V-shaped notches in their outer edge, said plates being extended in the longitudinal plane of the pump-tube, a wire wound over the outer edges of the said plates, and seating in the V-shaped notches thereof, and a perforated casing that fits over the said wire and the plates, and a means for attaching the plates and the casing to the pump-barrel.

EDWIN J. BASYE.

Witnesses:
O. P. MILLER,
M. A. COX.